Feb. 23, 1926.
J. A. SORRELLS
1,574,635
THREAD CUTTER FOR LOOMS
Filed Jan. 3, 1924
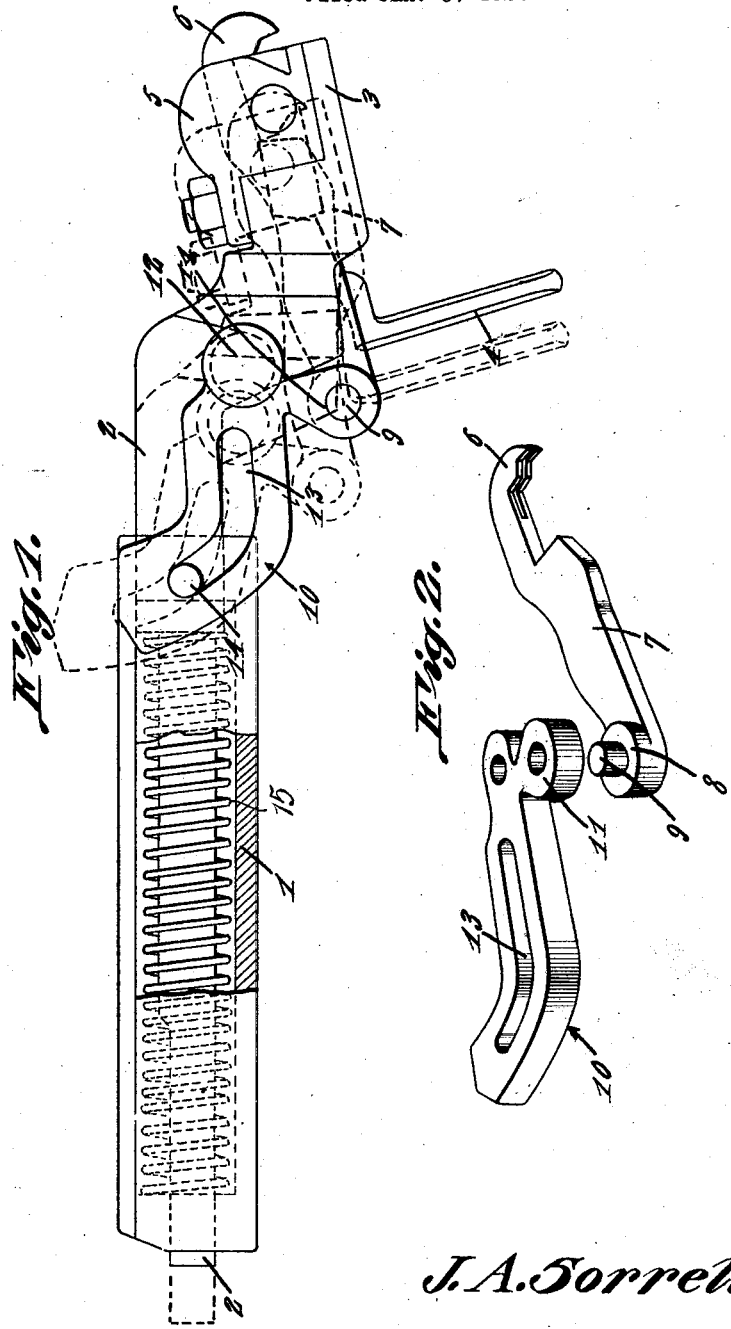
J. A. Sorrells, Inventor
By C. A. Snow & Co.
Attorneys Patented Feb. 23, 1926.

1,574,635

UNITED STATES PATENT OFFICE.

JAMES ALEXANDER SORRELLS, OF GAINESVILLE, GEORGIA, ASSIGNOR TO DRAPER CORPORATION, OF HOPEDALE, MASSACHUSETTS, A CORPORATION OF MAINE.

THREAD CUTTER FOR LOOMS.

Application filed January 3, 1924. Serial No. 684,207.

*To all whom it may concern:*

Be it known that I, JAMES ALEXANDER SORRELLS, a citizen of the United States, residing at Gainesville, in the county of Hall and State of Georgia, have invented a new and useful Thread Cutter for Looms, of which the following is a specification.

This invention relates to looms and more particularly to temple thread cutters therefor.

The object of the invention is to provide improved means for securing and operating a temple thread cutter of a loom dispensing with the use of the usual spring which secures the movable cutter blade and returns it to initial position after actuation by the lay.

Another object is to provide a cutter holder attachment actuated by the reciprocatory movement of the temple and which is so constructed and mounted as to avoid any possibility of the movable blade dropping off and being lost.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:

Figure 1 represents a side elevation of a temple equipped with this improved cutter operating mechanism; and Fig. 2 is a detail perspective view of the movable cutter and its actuating lever constituting this invention.

In the embodiment illustrated one form of the invention is shown in connection with a temple thread cutter of a well known commercial type such as is illustrated in Patents 704,715 dated July 15, 1902, and 765,687 dated July 26, 1904, and in which patents the operation of the weft replenishing loom to which the temple thread cutter is an adjunct is briefly described as is also the position and general function of the temple and the temple thread cutter.

The temple stand 1 is of usual construction and has slidably mounted therein a slide bar or shank 2 which at its rear end carries the usual pod 3 having a depending heel 4, designed to be struck by the lay, not shown, and the cap 5 in which is housed the toothed roll, not shown, all of which form no part of the present invention.

The thread cutting mechanism as in the patents above cited, is carried at the side and end of the shank 2 and comprises a fixed blade and a movable blade 6 cooperating with the fixed blade and between which the thread end is severed upon the operation of the movable blade. This movable blade 6 slides longitudinally and rocks vertically in the head of the temple shank 2, said blade normally standing with its hooked end elevated and projecting beyond the face of the temple head as shown in full lines in Fig. 1.

In this type of mechanism, the movable cutter blade is mounted in a slot extending longitudinally through the temple head and the movable cutter blade, if it is accidentally disconnected from or otherwise becomes separated from the means for actuating it, will be thrown or jarred out of the temple.

In the present invention, the shank or body 7 of the movable cutter blade 6, which is shaped as illustrated, is provided at the forward end at one side with a boss 8 and a laterally projecting stud 9 to which the actuating element is pivotally connected.

The actuator for the movable cutter blade is a bell crank lever. This lever has a longer elbow-shaped arm 10 and a shorter arm 11. The latter arm is provided with a bearing aperture fitting over and surrounding the stud 9 on the movable cutter blade. The lever is fulcrumed on the temple head by a stud 12 extending through a bearing aperture in the lever and into the temple head. The longer elbow-shaped arm 10 of the lever is provided with a correspondingly elbow-shaped slot 13 extending longitudinally thereof and this slot is adapted to fit and ride over a stud 14 projecting laterally from the rearward end of the temple stand.

In the operation of the loom, the parts connected with the temple normally occupy the full line position illustrated in Fig. 1, the temple shank and head being held in rearward position by the usual spring 15 mounted in the temple stand and surrounding the shank 2. When the lay beats up, it strikes the heel 4, carrying the temple head forwardly and sliding the shank 2 in the stand and compressing the spring 15.

In this invention, the relative movement which thus takes place between the temple head and the temple stand is utilized to actuate the cutting mechanism in a peculiar manner. Owing to the elbow-shaped slot 13 and its engagement with the stud 14, the bell crank lever will be rocked upon its fulcrum 12 when relative movement takes place between the temple head and stand. As the lay beats up, the slot 13 sliding upwardly on the stud 14 causes the movable cutter blade to be rocked downwardly and drawn forwardly into its slot, thus severing the filling. During any additional forward movement of the temple head beyond that necessary to effect the cutting action, the stud 14 slides along in the rearward portion of the slot 13 without materially affecting the position of the movable cutter blade 6. As the lay beats back, the spring 15 forces the temple head rearwardly and the actuating bell crank lever returns the movable cutter blade to its open rearwardly projected position.

The actuating bell crank lever fulcrumed to the temple head, pivotally connected to the freely movable cutter blade and having the elbow-shaped slot connection with the stud on the temple shank presents a very simple, effective and accurate means for giving the required movement to the movable cutter blade. It is also to be noted that this construction prevents any accidental disengagement of the movable cutter blade and the actuating element or bell crank lever. It is impossible to separate the stud 9 from the aperture in the arm 11 without first disconnecting the bell crank lever at its fulcrum point from the temple head, that is, by removing the stud 12. There is no danger of the actuator and the movable cutter blade becoming separated in the operation of the loom.

Having thus described the invention, what is claimed as new, and desired to be secured by Letters Patent, is:

1. A thread cutting temple for looms comprising a temple stand, a temple head having a shank mounted to slide longitudinally in the stand, a cutter blade mounted to rock and slide longitudinally in a slot in the temple head, a bell crank lever fulcrumed on the temple head and having means for connecting it to the temple stand to effect its rocking movement upon the reciprocation of the head and having a pivotal stud and cooperating closed aperture connection with the movable cutter blade, whereby the said blade is positively held against separation from the head while the bell crank lever is in position.

2. A thread cutting temple comprising a temple stand, a temple head having a shank mounted to slide in the stand, a movable thread cutter blade mounted in the temple head, an actuating element carried by the temple head connected to the movable cutter blade, and having an elbow-shaped slot and stud connection with the temple stand whereby, upon the movement of the temple head with respect to the stand, the movement of the stud in the elbow-shaped slot effects the actuation of the movable cutter blade.

3. A device of the class described comprising a movable cutter blade having a longitudinally extending shank with a laterally extending stud at its forward end, a bell crank lever having its shorter arm provided with a closed aperture for engagement with said stud, said lever being fulcrumed to the temple head and having in its longer arm a longitudinally extending slot to receive a stud on the temple stand whereby the movable blade is actuated by the reciprocatory movement of the temple head.

4. The combination, with a temple stand having a laterally extending stud and a shank slidable therein provided with a temple head, of a movable cutter blade mounted in said head and having a longitudinally extending shank with a laterally projecting stud at its forward end, a bell crank lever having its shorter arm provided with an aperture for pivotally engaging the stud on the cutter blade and having its longer arm provided with a slot extending longitudinally thereof and engaging the stud on the temple stand, and a fulcrum stud extending through and connecting said lever to the temple head, whereby the movable cutter blade is actuated by the reciprocatory movement of the temple head.

5. An actuator for the movable cutter blade of a temple thread cutter for looms comprising a bell crank lever having one arm elbow-shaped and provided with a slot conforming to the shape of said arm and adapted to receive a pin on the temple stand, said lever having its other arm extending laterally and in the same plane with the first arm and provided with an aperture for pivotal connection with the temple head whereby the movable cutter blade is actuated on the reciprocatory movement of the temple.

6. In a loom, a temple stand, a spring pressed member slidably mounted therein, a head connected with said member, a stationary cutter carried by the head, cutter means movably mounted in the head and having a hook-shaped cutting part for cooperating with the stationary cutter and having an angle shaped slot in its rear part and a pin connected to the stand engaging the slot.

In testimony that I claim the foregoing as my own, I have hereto affixed my signature.

JAMES ALEXANDER SORRELLS.